United States Patent [19]

Prestridge

[11] 4,116,790

[45] Sep. 26, 1978

[54] METHOD AND APPARATUS FOR SEPARATION OF FLUIDS WITH AN ELECTRIC FIELD AND CENTRIFUGE

[75] Inventor: Floyd Leon Prestridge, Tulsa, Okla.

[73] Assignee: Combustion Engineering, Inc., Windsor, Conn.

[21] Appl. No.: 816,227

[22] Filed: Jul. 18, 1977

[51] Int. Cl.$^2$ ................................................ B03C 5/00
[52] U.S. Cl. ..................................... 204/188; 204/302; 210/73 W; 210/84; 210/243; 210/512 R
[58] Field of Search ...................... 210/73 R, 73 W, 84, 210/243, 251, 294, 512 R; 204/186, 188–191, 302, 304, 305

[56] References Cited

U.S. PATENT DOCUMENTS

| | | | |
|---|---|---|---|
| 1,873,857 | 8/1932 | Worthington et al. ............... | 204/302 |
| 3,478,494 | 11/1969 | Lustenader et al. ............. | 210/243 X |
| 3,772,180 | 11/1973 | Prestridge ........................ | 204/191 X |
| 3,951,771 | 4/1976 | Burger ................................. | 204/190 |
| 3,971,718 | 7/1976 | Reid ..................................... | 210/84 |

*Primary Examiner*—William A. Cuchlinski, Jr.
*Attorney, Agent, or Firm*—Arthur L. Wade

[57] ABSTRACT

Fluids are separated from each other by passing their mixture through an electric field and centrifuge in sequence. The drops of a first fluid dispersed in a second fluid are coalesced by the force of an electric field to a predetermined size. The mixture is then passed into a centrifuge which develops the force to move the coalesced drops away from the other fluids of the mixture without reaching the value at which fluid shear forces, between the coalesced fluid and the fluid in which the coalesced fluid is dispersed, will fragment the coalesced drops.

15 Claims, 4 Drawing Figures

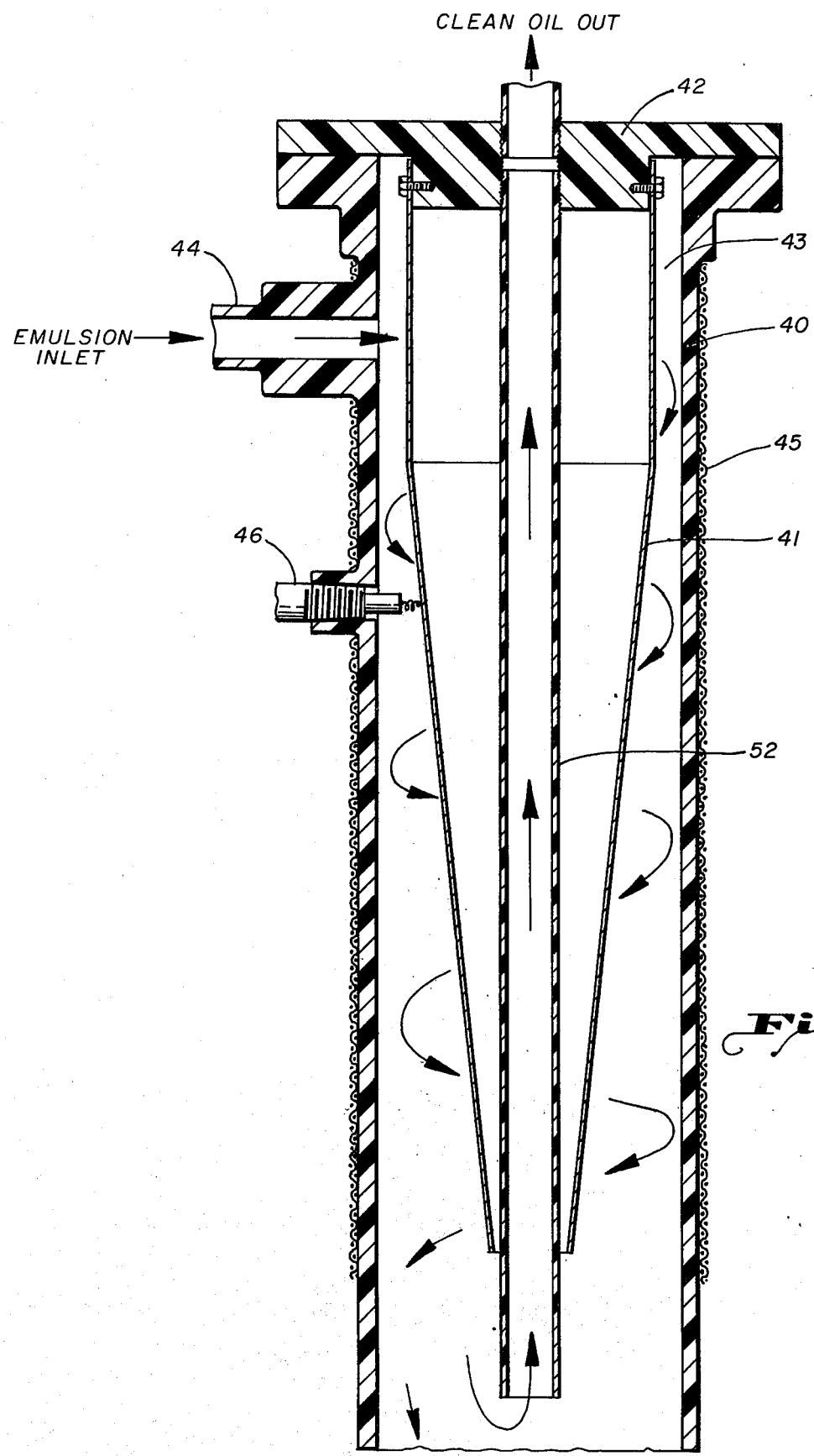

METHOD AND APPARATUS FOR SEPARATION OF FLUIDS WITH AN ELECTRIC FIELD AND CENTRIFUGE

BACKGROUND OF THE INVENTION

In recent years the need for rapid, high volume liquid/liquid separation in the oil industry has increased. Most of the secondary and tertiary recovery methods developed in the United States and Canada utilize large quantities of water, resulting in produced mixtures of oil and water which are difficult to separate. Even the major oil producing countries in the Middle East are now beginning to produce ever increasing volumes of brine with their oil, increasing the demand for high volume desalting equipment.

New developments and processes in other industries are also requiring liquid/liquid separation equipment. A good example in the mining industry is the solvent extraction processes. The chemical industry is utilizing similar liquid ion exchange processes. All of these processes require elaborate liquid/liquid mixing and/or separating facilities.

The use of high voltage electric fields to force the separation of oil field emulsions is a well known and accepted practice. These fields greatly speed the coalescence and separation of immiscible liquids, over conventional heater treaters and settlers using mechanical aids to coalescence. However, considerable retention time is still necessary, and large vessels are required if large volumes of emulsion are to be processed in a short time.

"Retention Time" is that period required for a first fluid dispersed in a second fluid to settle into a single body from which it can be removed. Many things will affect retention time. A large factor is the size of the drops formed by the dispersed fluid. Considering gravity to be the usual external force applied to the dispersed drops, if the diameter of these drops are doubled, their falling velocity through the fluid in which the drops are dispersed will be increased 10 times under Stokes Law. An electric field is a tool which has been used to increase the size of the dispersed drops by forcing separated drops to join each other, or coalesce. The increase in the falling velocity of the coalesced drops will enable the size of the retaining vessel required for retention time to be greatly reduced.

Another tool in the separation art is the centrifuge. The centrifuge generates a force usually expressed in "G's," G being the normal force of gravity. It is not unusual to develop the centrifugal force in a centrifuge to 1,000 G's in value. Many attempts have been made to apply centrifugal force on the heavier fluid of a fluid mixture to separate it from the less dense fluids of the mixture.

The centrifuge has had varying degrees of success in separating gas from liquids, gas from solids and liquids from solids. However, experience with liquid/liquid separation has been frustrating. The oil-water mixtures of the oil field have met bewildering limitations in centrifuge separation.

One of the reasons for the liquid/liquid separation limitations with the centrifuge is that the difference in densities of the liquids is not great enough. This is a vague statement, of course. But a more important problem can be stated more specifically.

When the dispersed phase is very fine, that is, the drops of dispersed liquid are down to the 2-5 micron range, the centrifugal force necessary to move the drops will develop shear forces between the liquids which will prevent further enlargement of the drop size. The mixture is therefore stabilized by centrifugal force at a dispersion which limits separation.

To breach the limitation on dispersed drop growth by liquid shear, it is evident that dispersed drops must be enlarged to a size by another force which will enable the drops to receive only enough centrifugal force to move the drops in separation without developing the shear force which will refragment the drops.

SUMMARY OF THE INVENTION

The present invention combines the electric field to coalesce small, dispersed, drops of liquid into larger drops with the centrifuge generating G's on the enlarging drops which will move them into separation from the liquid in which the drops are dispersed without the G's developing the shear force which will refragment the enlarged drops. Further, the flow through the centrifuge is oriented so the normal force of gravity will supplement the centrifuge G's in further reducing the retention time required for separation.

The invention is in the process of moving a mixture of liquids sequentially through an electric field and a centrifugal force. Structurally, the invention is in energized electrodes placed to define a path between them for their electric field through which the fluid mixture is flowed. The path is then extended into a centrifuge where the mixture has only sufficient G's placed upon it to move the coalesced liquid drops toward separation without developing shear forces between the separating liquids. Further, the centrifuge is oriented vertically to use the force of gravity to supplement the G's in separating the heavier liquids downward while the lighter liquids are withdrawn upwardly from the centrifuge.

Other features of the invention, and their advantages, will be apparent from the disclosure of the drawings, the description of the drawings and the claims which follow.

DESCRIPTION OF THE PREFERRED EMBODIMENT

At the outset of this description, an understanding on the terminology is desirable. Structuring definitions of the various facets of the inventive concepts in the disclosure is difficult to couch in robust language within this particular art. As novel as the concepts are, they are embodied in structure and process which have had to be described with mundane words such as vessel, flow, fluids, coalescense, electrodes, and electric field. This is hardly a dramatic arsenal from which to select telling combinations that will ring with the solid advances this invention makes in the art. Therefore, if I have not words available with a persuasive bite to them, I wish to at least make sure I am not misunderstood as I trace the periphery of the scope of the present invention.

First, consider the term "fluid." This term is to be applied to material in both a gaseous as well as liquid state. This invention is not to be limited to its application to gaseous fluids or liquid fluids. However, the fluids with which the invention was conceived, and reduced to practice, were produced oil and water of the oil well and the fluids of liquid ion exchange systems in the mining industry. Therefore, without limitations, the description will be based on the terminology of oil well production as it is processed to separation.

Centrifugal force will be generated on the fluids. The structure used to generate and apply this force has been variously desribed. For the purposes of this disclosure, the term "centrifuge" is used. This term applies to a structure in which a stream of fluids is directed into a spiral path. It could be used for the structure which is rotated from a source of power to develop force directed outwardly from the axis of rotation on fluids contained by the structure. However the structure develops and applies its centrifugal force to contained fluids, the structure will be taken as lending itself to the descriptive term "centrifuge," an essential element in the invention.

The first three drawing figures are similar in disclosing a combination of structure with which to generate an electric field and apply the field to a flowing stream of fluid and a centrifuge. In each Figure the circuit connected to the electrodes and centrifuge is different from the remaining Figures. However, in all the Figures an electric field is generated by a source connected to electrodes and a mixture of fluids passed through the field. The fluid is dispersed in the form of drops takes on a charge which results in coalescense of the drops. The mixture is then passed into a centrifuge in which the drops of dispersed fluid, enlarged by coalescense, are forced toward the inner wall of the centrifuge. The separation of dispersed fluid from the other fluid within the housing of the centrifuge enables the fluid to be withdrawn at different positions for the final separation sought as the end result of the invention.

Figure 1:
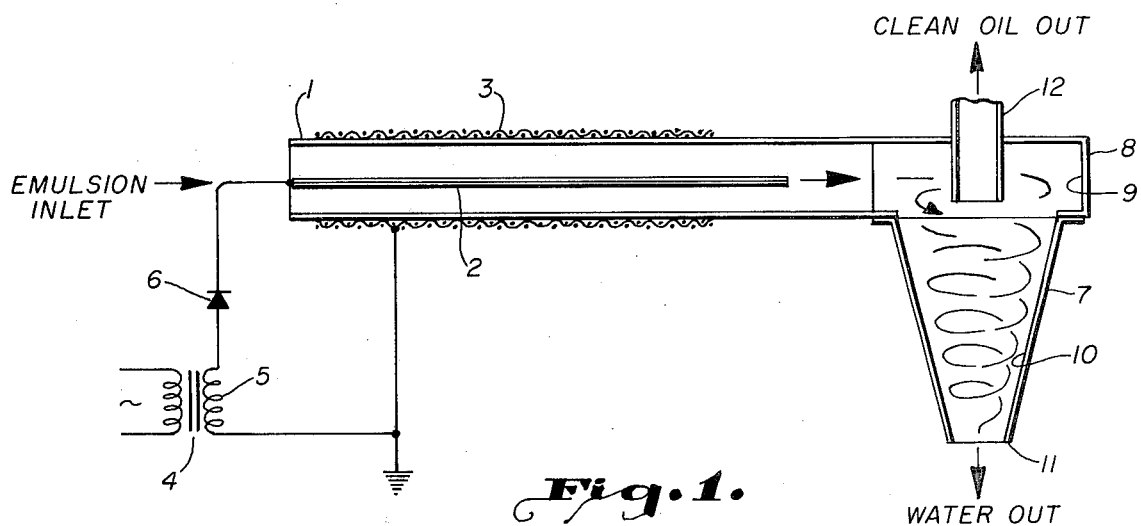
FIG. 1 is a sectioned elevation of a somewhat diagrammatic showing of an electric field coalescer and centrifuge embodying the present invention.

More specifically, FIG. 1 discloses a conduit 1 in which an electrode 2 in rod-like form is axially mounted. A conductive screen 3 is mounted as a sheath along a substantial length of conduit 1. A source of electrical energy is supplied to these two electrodes and an electric field is thereby generated between the electrodes.

Fluid passed into and along circuit 1 is within the electric field. If the fluid is a mixture of immiscible fluids, one of the fluids finely dispersed throughout the other fluids being in the form of drops which will accept a charge, agglomeration of the drops will take place. There is no purpose served by redefining the mechanism of coalescense in this disclosure. The system is generally well known in the art.

A transformer 4 is supplied from a source not shown. One side of secondary 5 is connected in parallel to ground and the screen 3. The second side of the secondary is connected to rod electrode 2 through a rectifier 6. This simple circuit between the source of electrical energy and the electrodes generates an electric field in conduit 1. A fluid mixture, in which finely dispersed drops of a first fluid, is passed down conduit 1. The dispersed drops accept a charge and begin to coalesce. Dependent upon many factors which determine the mobility of the dispersed drops, some coalescense is completed by the time the mixture reaches the entrance to centrifuge 7.

Essentially, centrifuge 7 is in the form of a cone. A chamber 8 is cylindrically shaped and mounted above the cone 7. The conduit 1 is connected to the chamber 8 to flow its fluid mixture tangential the internal wall surface 9. This direction, of course, imparts a circular motion to spin, to the fluids. The contained fluids are forced to flow downward upon the conical walls 10 of the centrifuge 7.

The speed of the stream of fluids, and the dimensions of the chamber 8 and centrifuge, determine the magnitude of the centrifugal force generated on the rotating-spiralling fluids. It is not necessary to analyze the magnitude of these forces in disclosing this invention. It is sufficient to point out that the G's, G representing the value of gravity, can be many multiples if the differential pressure across the centrifuge if established at a large enough value by the dimensions of the centrifuge and the volume of the fluid through-put.

In all events, or rather, in all ranges of centrifugal force values, forces which shear the separating fluids drops must be avoided. Sufficient centrifugal force must be placed upon the liquid mixture to physically move the coalesced drops of dispersed liquid to the wall 10 without the generation of shear force between the drops and the entraining liquid which will refragment the drops.

If this technological tightwire is successfully walked, the drops of dispersed liquid, perhaps in the order of 2-5 microns in size, will be staged up to the 8-10 micron size range by the electric field and then forced into continued agglomeration upon the internal wall of the centrifuge. Then the formerly dispersed fluid, coating the wall 10, will flow downward and exit the centrifuge 7 at exit 11.

Where does this leave the lighter, or less dense, of the fluids of the mixture? In the center of the conical chamber of the centrifuge. The heavier fluid was thrown into a layer on wall 10. The lighter fluid was left near the axis of the centrifuge. Conduit 12 is extended down into the center of chamber 8 to provide an exit for the lighter fluids that were left at the center of centrifuge 7. Separation is completed between the coalesced drops of fluid which would accept the charge of the electric field in conduit 1 and the remaining fluids of the mixture at the axis of the chamber 8 and centrifuge 7.

Figure 2:
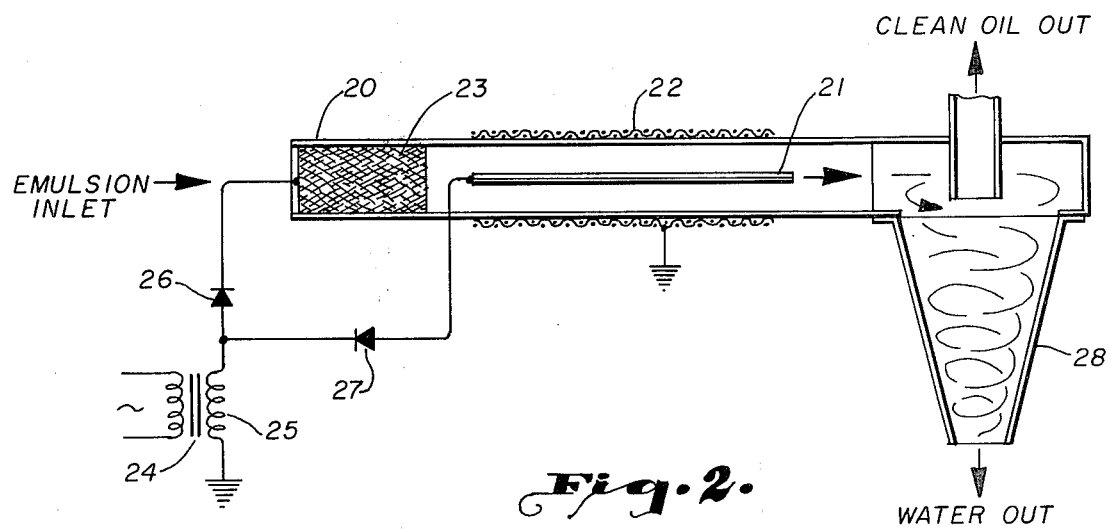
FIG. 2 is similar to FIG. 1 but with a different electrical source for the coalescer.

The circuit of FIG. 1 supplies a simple D.C. voltage to the electrodes 2, 3. In FIG. 2, an apparently more effective circuit is disclosed with the same general combination of coalescing structure and centrifuge. screen 22 is placed opposite rod-electrode 21 and on the outside of conduit 20. A third electrode 23 is in the form of a mesh of conductive material at the entrance to conduit 20. The fluid mixture forced into conduit 20 will pass through this mesh electrode 23 with intimate contact and opportunity for the dispersed drops of fluid to take on the charge of the electrode.

The circuit connected to the three electrodes is disclosed in U.S. patent, Prestridge U.S. Pat. No. 3,772,180, issued Nov. 13, 1973. Transformer 24 has one end of its primary 25 connected in parallel to mesh electrode 23 and rod electrode 21 through rectifiers 26, 27. The second end of the primary 25 is connected to ground. The third electrode, conductive sheath 22, is also connected to ground.

The disclosed circuit applies a positive charge to mesh electrode 23 and a negative charge to rod electrode 21. Therefore, the difference between these two establishes a relatively high intensity electric field. The positive charge accepted by the dispersed drops in passing through mesh electrode 23 generates a relatively intense force driving the drops into coalescense.

Compatible with the function of the systems disclosed in U.S. Pat. No. 3,772,180, the disclosed system of FIG. 2 provides two types of electrical fields to generate coalescing forces on the fluid mixture passing through conduit 20. It can be stated that the coalescense is carried out in stages before the mixture reaches the centrifuge.

In all events, the coalescing action of the electric field, or fields, in conduit 20 enlarges the dispersed drops to a size where the centrifugal force of centrifuge 28 can effectively take over and complete the separation. The function of centrifuge 28 is expected to be essentially the function of centrifuge 7 in FIG. 1.

Figure 3:
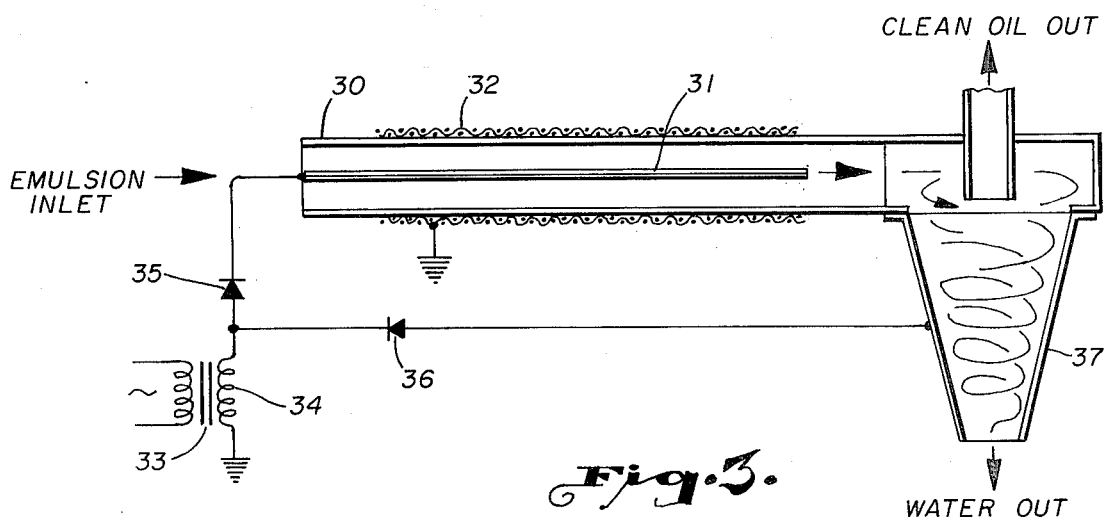
FIG. 3 is similar to FIG. 1 and with the outside wall of the centrifuge included in the electrical circuit.

At this point in the disclosure it is developed that the electric field can be given several variations with different results. FIG. 3 shows still another variation which is even more effective, or efficient, than the arrangements of FIGS. 1 and 2.

If the dispersed drops, coalesced in the electric field, bear a charge of one polarity, the internal wall of the centrifuge can be given an opposite charge and the dispersed drops attached to the charged wall. FIG. 3 discloses the simple structure required to embody this concept.

In FIG. 3, conduit 30 has its center electrode 31 and sheath electrode 32 in structural relationship similar to that of FIGS. 1 and 2. Further, transformer 33 has its primary 34 connected to rectifiers 35 and 36 similar to the FIG. 2 circuit. However, the positive connection is now to rod electrode 31 and the negative charge is applied to the wall of centrifuge 37.

This circuit arrangement of FIG. 3 provides a high potential difference between electrode 31 and the wall of centrifuge 37. As the dispersed, and coalescing, drops in the fluid mixture are charged by electrode 31 in conduit 30, there will be a high potential between these drops, as the mixture enters the centrifuge 37, and the wall of the centrifuge. The result will be an added force directed to drawing the coalesced and positively charged drops to the wall. These expectations were actually realized in a reduction to practice, lifting the theory from speculation toward reality. The actual reduction to practice was an important step in progressive development of the invention.

A pause is made to reflect on the fluid mixture processed in the reductions to practice of the invention. Oil and water mixtures were processed in the structure depicted in FIGS. 1, 2 and 3. It was the water which was dispersed in very small-sized drops in the oil. It was the water drops which readily accepted the positive charge and coalesced in the electric field. The drops of water were so fine, or small, that they were in the order of 2-5 microns in diameter. Only the electric field proved effective to move these drops in the dance of coalescense, bringing them up at least as far as the 8–10 micron range at which the centrifugal force could be applied to move them toward unification without generating the dreaded magnitudes of the liquid shear force between the oil and the enlarging drops of water.

This operation of the centrifuge on drops of water required a great deal less power for operating the centrifuge than prior attempts to move the smaller drop sizes. The art apparently accepted the limitation of driving the centrifuge, or flowing through the centrifuge, fast enough to begin the coalescense of the water drops and refragmenting the drops against the barrier of fluid shear forces. It has been a bewildering and frustrating cycle of frantically searching for the centrifugal speed which would wring out the dispersed lighter fluid from the entraining heavier fluid. Apparently the answer of bringing the dispersed drop up to a size which could be effectively enlarged by carefully applied centrifugal force was not conceived in the prior art. Certainly, initial electrical coalescense, at the entrance to the centrifuge, was not discovered prior to this invention.

Figure 4B:
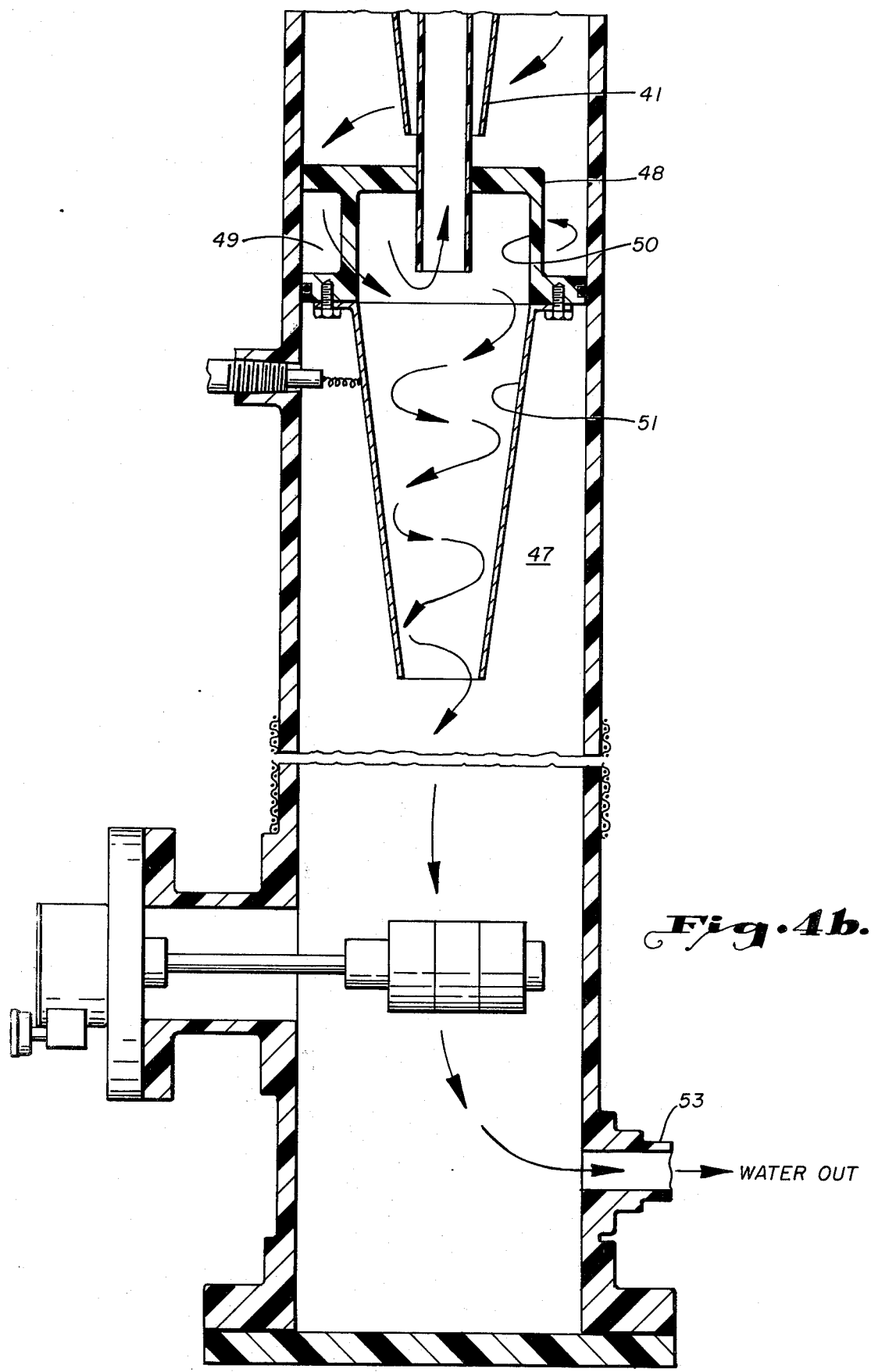
FIG. 4 (on two sheets) is a somewhat diagrammatic sectioned elevation of a coalescer with divergent electrodes and a centrifuge in vertical orientation.

The disclosure now launches into a more sophisticated application of the concepts of the invention. FIG. 4 is divided between two sheets of drawing, one being designated 4a and the second 4b. Together, FIGS. 4a and 4b depict a vertical form of electric coalescing section on top of a centrifuge section, both mounted on top of a heavier fluid discharge compartment.

In FIG. 4a conduit housing 40 is extended vertically. Conical electrode 41 is supported from a closure member 42. Fluids are flowed into the annulus 43 between the inner wall of housing 40 and the outer wall of electrode 41 through inlet 44.

Sheath electrode 45 is placed on the outside of conduit housing 40. The fluid mixture processed, conduit housing 40, center electrode 41 and sheath electrode 45 form the same general relationship these comparable elements form in FIGS. 1, 2 and 3. An electric field is formed between the electrodes and in the annulus through which the fluid mixture is passed. Coalescense of conductive fluid drops dispersed in the remaining fluids of the mixture takes place as in the structure disclosed in FIGS. 1, 2 and 3. However, there is a difference in the distribution of strength of the electric field which has advantages.

The voltage gradient of the electric field decreases as the fluid mixture flows downward in conduit housing 40. This voltage gradient is established by the fact that electrode 45 and electrode 41 physically diverge from each other in the downward direction of fluid mixture flow within conduit housing 40. This decrease in voltage gradient has certain advantages.

Again, the force applied to physically move dispersed drops within entraining fluid is considered. The drops move if placed in an electric field. The speed with which the drops move is dependent upon several factors. However, the voltage gradient of the field is a primary factor. If the drops are small (2–5 microns), the voltage gradient required to significantly coalesce must be so great that as the drop enlarge toward the 8–10 micron range the force of the field move the drops so rapidly that fluid shear forces between the drops and the fluid in which the drops are dispersed is great enough to refragment the enlarging drops. Therefore, some way of backing away from the voltage gradient of the electric field is very desirable. The divergent electrodes is one way to establish the decreasing voltage gradient.

The electric network to energize the conical electrode 41 and sheath electrode 45 is not disclosed in FIG. 4. Enough of network disclosure was disclosed in FIGS. 1–3. Here, in FIG. 4a, electrode 41 is shown as suspended from insulator-closure 42 and electrically connected to a network outside housing 40 with connector 46. An electrical connection to sheath 45 does not seem necessary.

The coalescing fluid mixture spirals down annulus 43 and is conducted into centrifuge 47 which is mounted below conical electrode. Centrifuge 47 receives all of the discharge from the coalescing section above it. The dispersed fluid drops are coalesced to the size where the centrifugal force applied to them will move the drops to the internal wall of the centrifuge without shearing or fragmenting the drops.

To direct the fluid mixture into the centrifuge 47, a cylindrical chamber 48 is mounted below electrode 41 and across the conduit housing 40. A passage 49 is formed to function as a tangential entrance to the interior of chamber 48. The fluids, flowing tangentially, against the interior wall of chamber 48, develop a centrifugal force on the more dense, and enlarging, drops of coalesced fluid which moves them to form a coating on the interior wall 50.

Of course the size of the chamber, and that of the fluid stream, must be set to develop only enough force on the dispersed drops which will effectively move them but will not shear, or fragment, them. Once the drops are staged up to an enlarged predetermined size by the electric field, such design is not an unreasonable goal. The stream of fluids continue to spiral down the inside wall 51 of the centrifuge, the dispersed fluid forced toward the wall 51 and the remaining, lighter, fluids being left in the center of the centrifuge.

Separation is now possible. A conduit 52 is extended down the axis of the conduit 40. Conduit 40 is extended through the upper closure member 42, down through conical electrode 41 and through the top of the upper cover of chamber 48. The lighter fluids of the centrifuged mixture will then flow up conduit 52 for final, positive, separation from the heavier, coalesced, drops of fluid forced to wall 51.

An additional force applied to the dispersed drops of fluid is provided in the cone of centrifuge 47. An electric potential is applied to the centrifuge which is of a polarity opposite to that accepted by the dispersed drops. With this arrangement, an additional force is placed upon the dispersed drops of fluid, moving the drops to the internal wall 51 of the centrifuge 47. The electrical connection 52 is disclosed as through the wall of the conduit 40 to the wall of centrifuge 47. This is the means with which the charge on the centrifuge wall is played from a source not shown.

The coalesced fluid drops, forced into a layer of dense fluid on wall 51, discharges from the lower end of centrifuge 47 and travels to the bottom of conduit 40. A conduit 53 is shown as providing passage from chamber 40 for the dense fluid which were coalesced and centrifuged from the remaining lighter fluids.

Arranging the coalescing structure and centrifuge is a vertical orientation provided the supplemental assistance of gravity in separating the fluids. The heavier, more dense, fluids are always being pulled down and away from the lighter fluids which are pulled up and out of conduit 52. The force of gravity, the pull of the electric field and the tug of the centrifugal force of the centrifuge combine to tear the drops of dispersed heavier fluid from the remainder of the mixture of fluids to bring about their final, positive separation from each other.

All of the concepts embodied in the structure of FIGS. 1, 2 and 3 are found in FIG. 4a and 4b. The electrical coalescense, the centrifugal force on the enlarged drops and the electrical attraction of the enlarged drops to the internal wall of the centrifuge. In FIG. 4a and 4b there is added the decreasing gradient field to avoid refragmentation of the enlarging drops and the vertical orientation of all the structure to add the component of gravity to draw the coalesced drops of fluid downward while the remaining fluid is drawn upward in the final separation.

These concepts of fluid separation have been applied with great advantage to liquid/liquid separation in particular. Even more specifically, the invention has been reduced to practice with oil/water as the fluids to be separated, the water being dispersed in the oil as very small drops. There are many other liquid/liquid separation problems. The solvent extraction systems of the mining art are good examples. Wherever a fluid, which will accept a charge, is finely dispersed in a so-called continuous phase of a second fluid, the present invention can be used.

From the foregoing, it will be seen that this invention is one well adapted to attain all of the ends and objects hereinabove set forth, together with other advantages which are obvious and inherent to the method and apparatus.

It will be understood that certain features and subcombinations are of utility and may be employed without reference to other features and subcombinations. This is contemplated by and is within the scope of the invention.

As many possible embodiments may be made of the invention without departing from the scope thereof, it is to be understood that all matter herein set forth or shown in the accompanying drawings is to be interpreted in an illustrative and not in a limiting sense.

The invention having been described, what is claimed is:

1. A process for separating a first fluid which is finely dispersed in a second fluid, including,
    flowing the first and second fluids as a mixture of immiscible fluids in a path,
    establishing an electric field in the path to coalesce the dispersed fluid into drops of predetermined size,
    flowing all the mixture in a second path,
    and generating a predetermined centrifugal force on all the mixture in the second path to cause the coalesced drops to agglomerate without re-dispersion into the second fluid and separate from the second fluid.

2. The process of claim 1, including,
    establishing a potential between the coalesced drops and a point within the mixture of fluids to supplement the centrifugal force on the coalesced drops to cause the drops to agglomerate and separate from the second fluid.

3. The process of claim 1, including,
    flowing the fluid mixture downward in its path through the electric field and centrifugal force to provide gravitational force upon the coalesced drops as a supplement to bring about separation of the fluids of the mixture.

4. The process of claim 1 in which the first fluid is a liquid in the form of finely dispersed drops and the second liquid has the drops of the first liquid dispersed in it.

5. The process of claim 4 in which the first liquid is water and the second liquid is oil.

6. The process of claim 1 in which the first fluid is more dense and heavy than the second liquid and will accept a charge more readily than the second liquid.

7. A process for separating a first fluid which is finely dispersed in a second fluid, including, flowing the first and second fluids as a mixture of immiscible fluids in a path, establishing an electric field with a finite strength at a point upstream of the fluid mixture in the path and a strength which decreases along a downstream distance from the upstream point to coalesce the first dispersed fluid into drops of predetermined size, flowing the mixture in a second path, and generating a predetermined centrifugal force on the mixture in the second path to move the drops coalesced by the electric field and cause the coalesced drops to agglomerate without redispersion in the second fluid and separate from the second fluid.

8. An electric-centrifugal processor for mixtures of multiple fluids, including, a first vessel, a source of a mixture of multiple fluids, a flow path formed for the mixture within the first vessel, electrodes mounted within the first vessel and on each side of the flow path, a source of electric energy connected to the electrodes with which an electric field is established by the electrodes so that the fluid mixture flows in the field while flowing down the path to coalesce one of the fluids into drops of predetermined size within another of the fluids, a second vessel connected to the first vessel so as to receive the entire fluid mixture from the path of the first vessel, and means within the second vessel for developing a predetermined centrifugal force on the entire fluid mixture received from the first vessel to move the coalesced drops of the one of the fluids into an agglomeration separate from the other of the fluids without redispersion of the one fluid into the other fluid.

9. The processor of claim 8 in which, the second vessel and means comprise a centrifuge which is connected to receive all of the fluid mixture from the first vessel and flow the mixture tangential to the internal wall, the predetermined centrifugal force thereby generated on the fluid mixture forcing the coalesced drops into a layer on the internal wall without redispersion and from which the agglomerated fluid flows to separation from the remaining fluids of the mixture.

10. The processor of claim 9 in which, the vessels of the processor are arranged and aligned vertically so the fluids flow downward while processed by the electric field and centrifuge, whereby the force of gravity acts downward on the coalesced and centrifuged drops to further their separation from the remaining fluids of the mixture.

11. The processor of claim 9 wherein, the electrodes are mounted in the first vessel and on each side of the flow path so as to be spaced a finite distance from each other at a point in the path and diverged from each other in the downstream direction of the flow path.

12. The processor of claim 8 in which the first fluid is a liquid in the form of finely dispersed drops and the second fluid is a liquid in which the drops of the first fluid are dispersed.

13. The processor of claim 12 in which the first liquid is more dense and heavy than the second liquid and will accept a charge more readily than the second liquid.

14. The processor of claim 13 in which the first liquid is water and the second liquid is oil.

15. An electric-centrifugal processor for mixtures of multiple fluids, including, a first vessel, a source of a mixture of multiple immiscible fluids including a first fluid finely dispersed in a second fluid, a flow path formed for the mixture within the first vessel, electrodes mounted within the first vessel and on each side of the flow path, a source of electric energy connected to the electrodes with which an electric field is established by the electrodes so that the fluid mixture flows in the field while flowing down the path, to coalesce first fluid drops into drops of predetermined size, a second vessel connected to the first vessel so as to receive the entire fluid mixture from the path of the first vessel, a centrifuge mounted within the second vessel so as to develop a predetermined centrifugal force on the entire fluid mixture by flowing the mixture tangential to the internal wall of the centrifuge, the predetermined centrifugal force moving the coalesced first fluid drops into a layer on the internal wall without redispersion into the second fluid to flow to separation from the remaining fluids of the mixture, and means for maintaining a charge on the internal wall of the centrifuge opposite to the charge accepted by the coalesced drops of the first fluid, whereby the charge generates a force on the drops which aids the centrifugal force in bringing the drops to the wall of the centrifuge.

* * * * *